United States Patent
Mamtimin et al.

(10) Patent No.: US 11,635,543 B2
(45) Date of Patent: Apr. 25, 2023

(54) BOREHOLE DENSITY MEASUREMENT USING PULSED NEUTRON TOOL

(71) Applicant: Halliburton Energy Services, Inc., Houston, TX (US)

(72) Inventors: Mayir Mamtimin, Spring, TX (US); Jeffrey James Crawford, Katy, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/334,223

(22) Filed: May 28, 2021

(65) Prior Publication Data
US 2022/0171086 A1 Jun. 2, 2022

Related U.S. Application Data

(60) Provisional application No. 63/119,098, filed on Nov. 30, 2020.

(51) Int. Cl.
*G01V 5/10* (2006.01)
*E21B 49/00* (2006.01)
*E21B 47/12* (2012.01)

(52) U.S. Cl.
CPC .............. *G01V 5/102* (2013.01); *E21B 49/00* (2013.01); *E21B 47/12* (2013.01)

(58) Field of Classification Search
CPC .......... G01V 5/102; E21B 49/00; E21B 47/12
See application file for complete search history.

(56) References Cited

U.S. PATENT DOCUMENTS

| | | | | |
|---|---|---|---|---|
| 3,244,882 A | * | 4/1966 | Baldwin | G01V 5/104 |
| | | | | 250/269.6 |
| 3,309,521 A | * | 3/1967 | Bargainer, Jr. | E21B 47/12 |
| | | | | 324/323 |

(Continued)

FOREIGN PATENT DOCUMENTS

WO 2011152924 12/2011

OTHER PUBLICATIONS

Peeters, M., (1994). Pulsed neutron tools applied to three-phase production-logging in horizontal wells. SPWLA 35th Annual Logging Symposium 1994 (Accessed Jun. 4, 2021).

(Continued)

*Primary Examiner* — Manuel A Rivera Vargas
*Assistant Examiner* — Yaritza H Perez Bermudez
(74) *Attorney, Agent, or Firm* — John Wustenberg; C. Tumey Law Group PLLC

(57) ABSTRACT

Systems and methods employed measure borehole density by neutron induced gammas using a pulsed neutron tool. Traditional nuclear density methods only measure a bulk average density of the surrounding material. As discussed below, methods to measure only the borehole density excluding the contamination from the formation are disclosed. Specifically, the proposed methods use unique signatures from each geometric region to directly measure the borehole density or compensate for the contamination from formation. This method may be achieved by a borehole density measurement using differential attenuation of capture gamma from casing iron, a borehole density measurement using differential attenuation of inelastic gamma from oxygen, a differential attenuation of any induced gamma from any element from borehole and formation, or any combination thereof.

19 Claims, 4 Drawing Sheets

(56) References Cited

U.S. PATENT DOCUMENTS

| | | | |
|---|---|---|---|
| 4,378,295 | A | 3/1983 | Axtmann |
| 4,459,479 | A * | 7/1984 | Smith, Jr .................. G01T 1/40 |
| | | | 250/256 |
| 5,406,078 | A * | 4/1995 | Jacobson ............... G01V 5/101 |
| | | | 250/261 |
| 5,804,820 | A * | 9/1998 | Evans .................... G01V 5/104 |
| | | | 250/269.2 |
| 7,292,942 | B2 | 11/2007 | Ellis et al. |
| 2010/0292927 | A1 | 11/2010 | Jacobson et al. |
| 2011/0202276 | A1 | 8/2011 | Truax et al. |
| 2011/0282818 | A1 | 11/2011 | Chen et al. |
| 2013/0105680 | A1 | 5/2013 | Guo et al. |
| 2015/0083905 | A1 | 3/2015 | Jacobson et al. |
| 2015/0108339 | A1 * | 4/2015 | Guo ....................... G01V 5/101 |
| | | | 250/269.6 |
| 2016/0216400 | A1 | 7/2016 | Navarro-Sorroche et al. |
| 2016/0238736 | A1 | 8/2016 | Guo et al. |
| 2016/0299251 | A1 | 10/2016 | Luo et al. |
| 2016/0320523 | A1 * | 11/2016 | Inane ....................... G01V 5/12 |
| 2017/0089846 | A1 | 3/2017 | Guo et al. |
| 2017/0145821 | A1 | 5/2017 | Hu et al. |
| 2017/0167243 | A1 | 6/2017 | Guo et al. |
| 2017/0199298 | A1 | 7/2017 | Hu et al. |
| 2017/0211382 | A1 | 7/2017 | Jacobson et al. |
| 2018/0038990 | A1 | 2/2018 | Hu et al. |
| 2018/0210109 | A1 | 7/2018 | Guo et al. |
| 2018/0245451 | A1 | 8/2018 | Hu et al. |
| 2018/0246250 | A1 | 8/2018 | Navarro Sorroche et al. |
| 2018/0267200 | A1 | 9/2018 | Hu et al. |
| 2018/0292204 | A1 | 10/2018 | Lee et al. |
| 2018/0329109 | A1 | 11/2018 | Navarro Sorroche et al. |
| 2019/0010800 | A1 | 1/2019 | Hu et al. |
| 2019/0056525 | A1 | 2/2019 | Hu et al. |
| 2020/0109626 | A1 | 4/2020 | Hu et al. |
| 2020/0199995 | A1 | 6/2020 | Hu et al. |
| 2022/0171086 | A1 * | 6/2022 | Mamtimin ............... E21B 49/00 |

OTHER PUBLICATIONS

Trcka, D. (1996). Measuring Three-Phase Holdup in Horizontal Wellbores Using Pulsed Neutron Instruments. SPE 36561, 759-766 (Accessed Jun. 4, 2021).

Roscoe, B. A. (1996). Three-Phase Holdup Determination in Horizontal Wells Using a Pulsed-Neutron Source. SPE 37147, 895-905 (Accessed Jun. 4, 2021).

Halliburton, Well Integrity Services You Can Trust, HO13826, Apr. 2021.

Hertzog, R.C. (1980). Laboratory and Field Evaluation of an Inelastic Neutron Scattering and Capture Gamma Ray Spectrometry Tool. Society of Petroleum Engineers Journal, 20(5), 327-340 (Accessed Jun. 4, 2021).

Salford, J., Truax, J., Hrametz, A., & Haramboure, C. (2009). A new neutron-induced gamma-ray spectroscopy tool for geochemical logging. SPWLA 50th Annual Logging Symposium 2009, 1-14 (Accessed Jun. 4, 2021).

Galford, J., Truax, J., Hrametz, A., & Haramboure, C. (2009). A new neutron-induced gamma-ray spectroscopy tool for geochemical logging. SPWLA 50th Annual Logging Symposium 2009, 1-14.

Hertzog, R.C. (1980) Laboratory and Field Evaluation of an Inelastic Neutron Scattering and Capture Gamma Ray Spectrometry Tool. Society of Petroleum Engineers Journal, 20(5), 327-340.

Evans, et al., Iioli, . [Society of Petroleum Engineers SPE Annual Technical Conference and Exhibition—San Antonio, Texas, USA (Oct. 8, 2012)] SPE Annual Technical Conference and Exhibition—Sourceless Neutron-Gamma Density (SNGD): A Radioisotope-Free Bulk Density Measurement: Physics Principles, Environmental Effects, and Applications.

Halliburton, Nuclear Magnetic Resonance (NMR) Logging, Xaminer Magnetic Resonance (SMR) Service, High-Resolution, High-Efficiency, New NMR Technology, HO12700, May 2018.

Halliburton, Well Integrity Services You Can Trust, H013826, Apr. 2021.

* cited by examiner

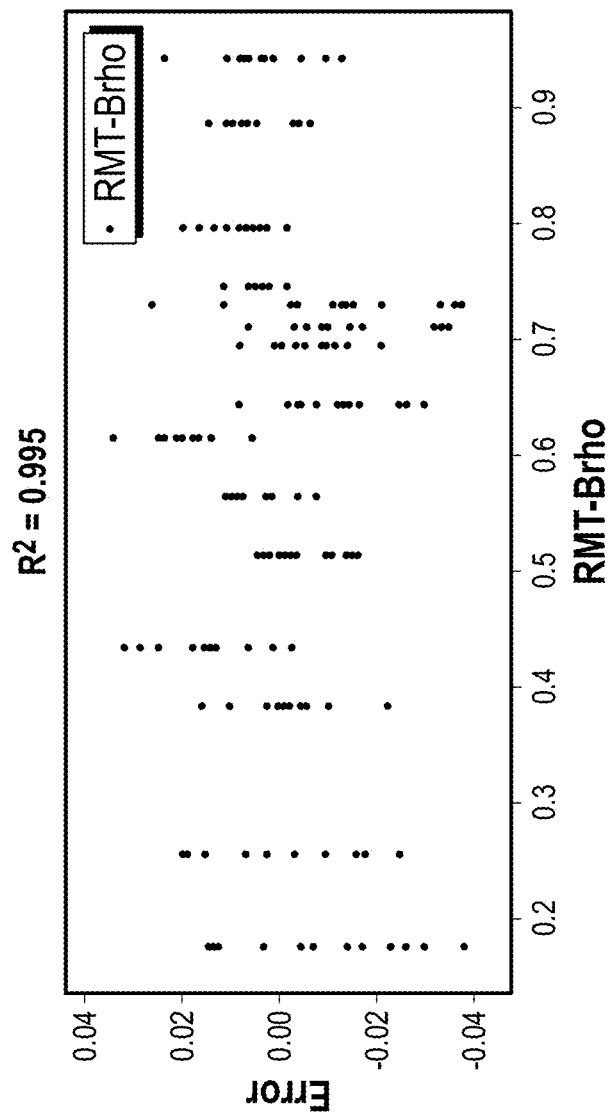
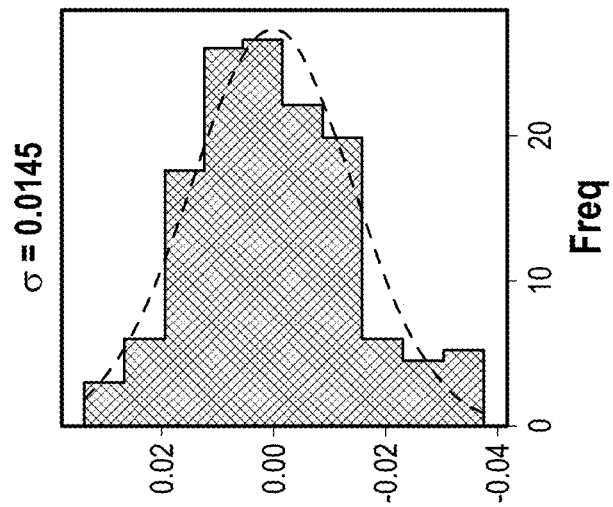
FIG. 6A
FIG. 6B

BOREHOLE DENSITY MEASUREMENT USING PULSED NEUTRON TOOL

BACKGROUND

Operators of existing wells often track borehole holdup, especially in horizontal wellbores. Holdup is defined as a reference to multiphase flow in pipes, the fraction of a particular fluid present in an interval of pipe. In multiphase flow, each fluid moves at a different speed due to different gravitational forces and other factors, with the heavier phase moving slower, or being more held up, than the lighter phase. The holdup of a particular fluid is not the same as the proportion of the total flow rate due to that fluid, also known as the fluids "cut." To determine in-situ flow rates, it is necessary to measure the holdup and velocity of each fluid. Borehole holdup measures the volumetric ratios of oil, water, and gas components in a wellbore.

In hydrocarbon applications, density measurement is often necessary to find formation porosity. Currently, there are two main techniques to measure density, gamma-gamma or neutron-gamma methods. Both methods rely on the attenuation of high energy photons through matter to correlate measurement to the bulk density. Both methods are volumetric in nature, producing an output that is an averaged density value. This due to the large number of possible interactions along the interaction path of radiation. It is challenging to isolate the specific density of a unique geometrical region.

BRIEF DESCRIPTION OF THE DRAWINGS

These drawings illustrate certain aspects of some examples of the present disclosure and should not be used to limit or define the disclosure.

FIGS. 6A and 6B illustrate the borehole density algorithm quality.

DETAILED DESCRIPTION

The present disclosure generally relates to systems and methods for measuring density of the borehole fluid with neutron-based methods. The systems and methods employed measure borehole density by neutron induced gammas using a pulsed neutron tool. Borehole density is defined as a measurement of the average density of the material or materials between source and detector. Traditional nuclear density methods only measure a bulk average density of the surrounding material. As discussed below, methods to measure only the borehole density excluding the contamination from the formation are disclosed. Specifically, the proposed methods use unique signatures from each geometric region to directly measure the borehole density or to compensate for the contamination from the formation. This method may be achieved by a borehole density measurement using differential attenuation of capture gamma from casing iron, a borehole density measurement using differential attenuation of inelastic gamma from oxygen, a differential attenuation of any induced gamma from any element from borehole and formation, or any combination thereof.

Figure 1:
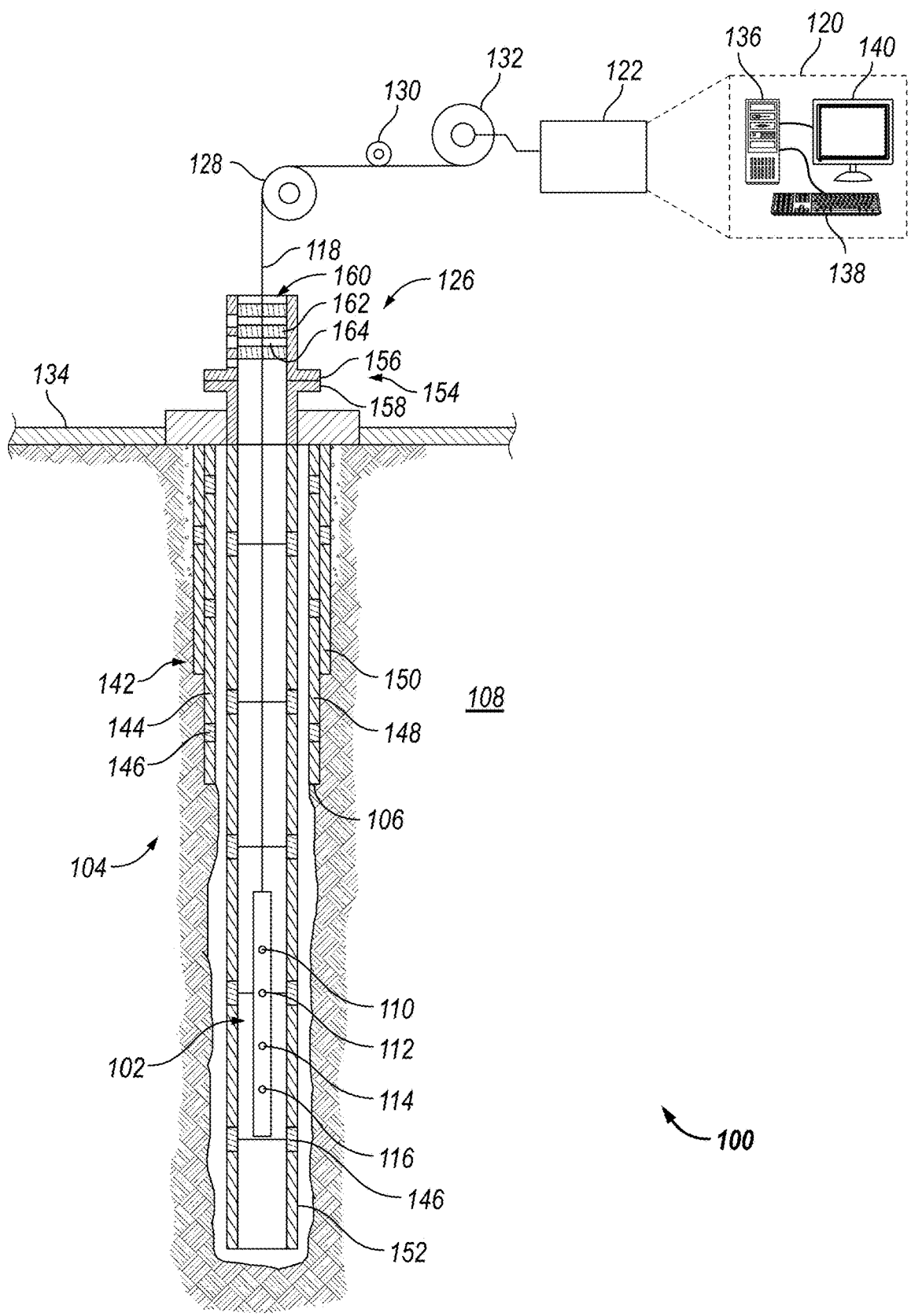
FIG. 1 illustrates a downhole tool in a wireline configuration, in accordance with examples of the present disclosure.

FIG. 1 illustrates logging/measuring operation 100, as disclosed herein, utilizing a pulsed-neutron logging tool 102. FIG. 1 illustrates a cross-section of borehole 104 with a pulsed-neutron logging tool 102 traveling through well casing 106. Borehole 104 may traverse through formation 108 as a vertical well and/or a horizontal well. Pulsed-neutron logging tool 102 contains a neutron source 110, a first neutron detector 112, a second neutron detector 114, and a gamma ray detector 116. Pulsed-neutron logging tool 102 is suspended by a conveyance 118, which communicates power from a logging facility 120 to pulsed-neutron logging tool 102 and communicates telemetry from pulsed-neutron logging tool 102 to information handling system 122. In examples, pulsed-neutron logging tool 102 may be operatively coupled to a conveyance 118 (e.g., wireline, slickline, coiled tubing, pipe, downhole tractor, and/or the like) which may provide mechanical suspension, as well as electrical connectivity, for pulsed-neutron logging tool 102. Conveyance 118 and pulsed-neutron logging tool 102 may extend within casing string 142 to a desired depth within borehole 104. Conveyance 118, which may include one or more electrical conductors, may exit wellhead 126, may pass around pulley 128, may engage odometer 130, and may be reeled onto winch 132, which may be employed to raise and lower the tool assembly in borehole 104. The position of pulsed-neutron logging tool 102 may be monitored in a number of ways, including an inertial tracker in pulsed-neutron logging tool 102 and a paid-out conveyance length monitor in logging facility 120 (e.g., an idler wheel on the wireline cable).

Multiple such measurements may be desirable to enable the system to compensate for varying cable tension and cable stretch due to other factors. Information handling system 122 in logging facility 120 collects telemetry and position measurements and provides position-dependent logs of measurements from pulsed-neutron logging tool 102 and values that may be derived therefrom.

Pulsed-neutron logging tool 102 generally includes multiple instruments for measuring a variety of downhole parameters. Wheels, bow springs, fins, pads, or other centralizing mechanisms may be employed to keep pulsed-neutron logging tool 102 near the borehole axis during measurement operations. During measurement operations, generally, measurements may be performed as pulsed-neutron logging tool 102 is drawn up hole at a constant rate. The parameters and instruments may vary depending on the needs of the measurement operation.

Pulsed-neutron logging tool 102 operates by generating pulses of high energy neutrons that radiate from neutron source 110 into the surrounding environment including borehole 104 and formation 108. The highly energetic neutrons entering the surrounding environment interact with atomic nuclei, inducing gamma radiation. The induced gamma rays may be recorded as a scattering rate (and hence the rate of energy loss) and are generally dominated by the concentration of hydrogen atoms. Induced gamma rays and neutrons may be recorded by first neutron detector 112, second neutron detector 114, and/or gamma ray detector 116. As the presence of hydrogen is primarily attributable to the presence of water or hydrocarbon fluids, the rate of energy loss and gamma spectrum may yield accurate knowledge of borehole holdup. Accurate knowledge of the borehole holdup determines the accuracy of oil saturation in the formation as well as determining the flow in horizontal production wells.

Measurements taken by pulsed-neutron logging tool 102 may be gathered and/or processed by information handling system 122. For example, signals recorded by pulsed-neutron logging tool 102 may be sent to information handling system 122 where they may be stored on memory and then processed. The processing may be performed real-time during data acquisition or after recovery of pulsed-neutron logging tool 102. Processing may alternatively occur downhole on an information handling system 101 disposed on pulsed-neutron logging tool 102 or may occur both downhole and at surface. In some examples, signals recorded by pulsed-neutron logging tool 102 may be conducted to information handling system 122 by way of conveyance 118. Information handling system 122 may process the signals, and the information contained therein may be displayed for an operator to observe and stored for future processing and reference. Information handling system 122 may also contain an apparatus for supplying control signals and power to pulsed-neutron logging tool 102.

As noted above, systems and methods of the present disclosure may be implemented, at least in part, with information handling system 122. While shown at surface 134, information handling system 122 may also be located at another location that is remote from borehole 104. In examples information handling system 122 may be disposed on pulsed-neutron logging tool 102, which may allow for processing to occur downhole. Additionally, on or more information handling systems 122 may be utilized during measurement operations. In such examples, a first information handling system 122 may be at surface 134 and a second information handling system 122 may be disposed on pulsed-neutron logging tool 102 downhole. Information handling system 122 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 122 may be a processing unit 136, a network storage device, or any other suitable device and may vary in size, shape, performance, functionality, and price. Information handling system 122 may include random access memory (RAM), one or more processing resources such as a central processing unit (CPU) or hardware or software control logic, ROM, and/or other types of nonvolatile memory. Additional components of the information handling system 122 may include one or more disk drives, one or more network ports for communication with external devices as well as an input device 138 (e.g., keyboard, mouse, etc.) and video display 140. Information handling system 122 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 further illustrates a typical casing string 142 may extend from wellhead 126 at or above ground level to a selected depth within borehole 104. Casing string 142 may comprise a plurality of joints 144 or segments of casing string 142, each joint 144 being connected to the adjacent segments by a collar 146. There may be any number of layers in casing string 142. For example, a first casing 148 and a second casing 150. It should be noted that there may be any number of casing layers. FIG. 1 also illustrates a typical pipe string 152, which may be positioned inside of casing string 142 extending part of the distance down borehole 104. Pipe string 152 may be production tubing, tubing string, casing string, or other pipe disposed within casing string 142. Pipe string 152 may comprise concentric pipes. It should be noted that concentric pipes may be connected by collars 146. Pulsed-neutron logging tool 102 may be dimensioned so that it may be lowered into borehole 104 through pipe string 152, thus avoiding the difficulty and expense associated with pulling pipe string 152 out of borehole 104. In examples, cement (not illustrated) may be disposed on the outside of pipe string 152. Cement may further be disposed between pipe string 152 and casing string 142. It should be noted that cement may be disposed between any number of casings, for example between first casing 148 and second casing 150.

In logging systems, such as, for example, logging systems utilizing the pulsed-neutron logging tool 102, a digital telemetry system may be employed, wherein an electrical circuit may be used to both supply power to pulsed-neutron logging tool 102 and to transfer data between information handling system 122 and pulsed-neutron logging tool 102. A DC voltage may be provided to pulsed-neutron logging tool 102 by a power supply located above ground level, and data may be coupled to the DC power conductor by a baseband current pulse system. Alternatively, pulsed-neutron logging tool 102 may be powered by batteries located within the downhole tool assembly, and/or the data provided by pulsed-neutron logging tool 102 may be stored within the downhole tool assembly, rather than transmitted to the surface during logging (corrosion detection).

With continued reference to FIG. 1, wellhead 126 is described. Wellhead 126 allows for entry into borehole 104, such as the placement of pulsed-neutron logging tool 102 into pipe string 152. In examples, wellhead 126 may include a lubricator head 154 may comprise a lubricator head flange 156 which may be coupled to and sealed with lubricator body flange 158. Lubricator head 154 comprises sealing cartridge 160. Sealing cartridge 160 may be removable from lubricator head 154. Sealing cartridge 160 may be a container comprising a plurality of sealing elements 162 and lubricator cavities 164. Sealing elements 162 may comprise, but are not limited to, elastomeric materials, thermoplastic materials, thermosetting materials, composites thereof, or combinations thereof. Sealing elements 162 comprise an inner diameter to allow for pulsed-neutron logging tool 102, conveyance 118, wireline, coiled tubing, and/or the like to be disposed into borehole 104. Sealing elements 162 form a seal around conveyance 118 (or tubing if provided). Sealing elements 162 are selected such that the length of the diameter of the inner diameter is able to sufficiently seal around conveyance 118. In some example methods, a sealing cartridge 160 comprising a plurality of sealing elements 162 of one size may be removed if desired and exchanged for a different sealing cartridge 160 comprising a plurality of sealing elements 162 of a different size if desired. For example, if a wireline operation requires sealing elements 162 of a first size, upon completion of said wireline operation, the sealing cartridge 160 comprising the sealing elements 162 of a first size may be removed from lubricator head 154 and replaced with a second sealing cartridge 160 comprising sealing elements 162 of a second size to perform a subsequent operation, for example a tripping operation.

Figure 2:
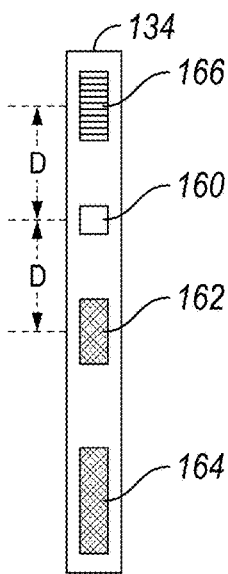
FIG. 2 is a diagram of illustrative embodiments of a pulsed-neutron logging tool

FIG. 2 shows a first illustrative setup of pulsed-neutron logging tool 102 having a pulsed neutron source 110 that is positioned equidistant from a gamma ray detector 166 and a first neutron detector 112. In examples, pulsed neutron source 110 may be replaced with a continuous neutron source such as Americium-Beryllium (Am—Be) chemical source. Pulsed-neutron logging tool 102 may also include a second neutron detector 114. The two neutron detectors 112 and 114 may be, respectively, termed the "near" and "far" neutron detectors. "Near" being the closest neutron detector to pulsed neutron source 110 and "far" being the furthest neutron detector from pulsed neutron source 110. Neutron detectors 112 and 114 may be designed to count thermal (around about 0.025 eV) and/or epithermal (between about 0.1 eV and 100 eV) neutrons. Suitable neutron detectors include Helium-3 (He-3) filled proportional counters, though other neutron counters may also be used. To improve tool performance, each neutron detector 112 and/or 114 may be implemented as a bank of individual detection devices. In accordance with standard neutron porosity tool measurement techniques, the ratio of far-to-near neutron detector counts is indicative of formation porosity.

With continued reference to FIG. 2 gamma ray detector 166 may be implemented as a scintillation crystal coupled to a photomultiplier tube. As with neutron detectors 112 and/or 114, gamma ray detector 166 may be implemented as a bank of individual detection devices whose results are aggregated. In FIG. 2, gamma ray detector 166 is "co-distant" with the near neutron detector 112, i.e., it is positioned at the same distance D from neutron source 110 as near neutron detector 112. As illustrated in FIG. 2, gamma ray detector 166 and first neutron detector 112 may be located in opposite directions from neutron source 110.

Figure 3A:
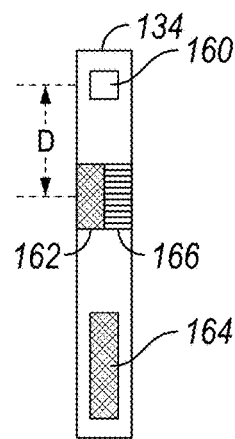
FIG. 3A-3B are diagrams of alternative embodiments of a pulsed-neutron logging tool.
Figure 3B:
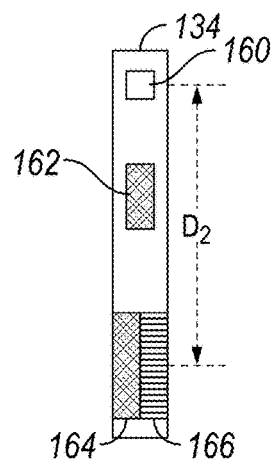

As discussed above, FIGS. 3A and 3B illustrate alternative embodiments of pulsed-neutron logging tool 102. FIG. 3A shows an alternative example in which pulsed-neutron logging tool 102 that has a gamma ray detector 166 and a near neutron detector 112 co-located, i.e., located side-by-side at the same distance D from the neutron source 110. FIG. 3B shows yet another alternative example in which pulsed-neutron logging tool 102 has a gamma ray detector 166 and a far neutron detector 114 co-located at a distance D2 from neutron source 110.

Multiple neutron detectors 112, 114 of pulsed-neutron logging tool 102, enable pulsed-neutron logging tool 102 to measure formation porosity using any of the existing multiple-spacing techniques. In addition, the presence of gamma ray detector 166 having a common distance from neutron source 110 with one of the neutron detectors 112 or 114, enables the measurement of borehole holdup, discussed below.

Figure 4:
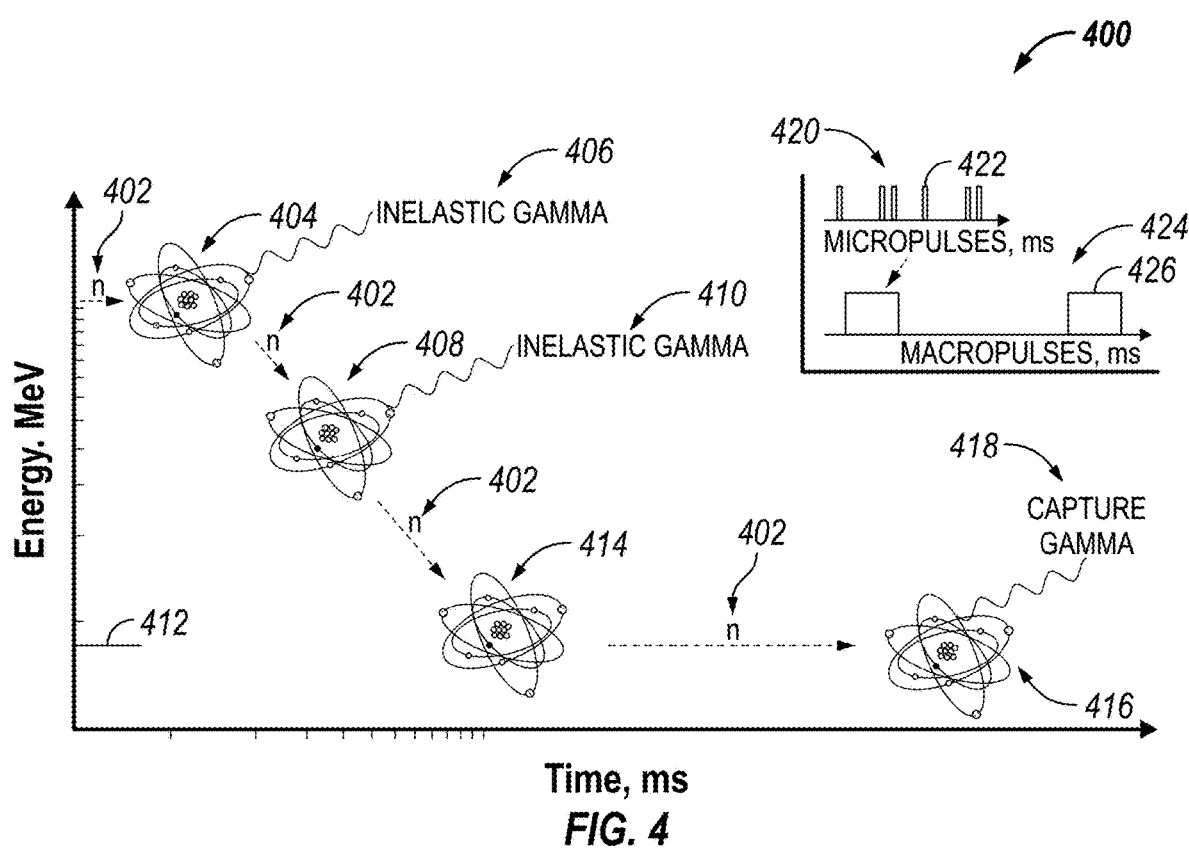
FIG. 4 illustrates the energy of a neutron as it interacts in the present disclosure.

During measurement operations, neutrons emitted from neutron source 110 undergo weak electromagnetic scattering and/or nuclear absorption when interacting with matter. Scattering may either be elastic (n, n) or inelastic (n, n'). In an elastic interaction a fraction of the neutrons kinetic energy is transferred to the nucleus. An inelastic interaction is similar, except the nucleus undergoes an internal rearrangement. Additionally, neutrons may also undergo an absorption interaction. In most absorption interactions, elastic cross section is nearly constant, whereas the inelastic scattering cross section and absorption cross sections are proportional to the reciprocal of the neutrons speed. Referring to FIG. 4, heavy nuclei 420 have large and narrow resonances 422 that appears for neutrons in the eV range, whereas light nuclei 424 have broad and smaller resonances 426 that appear in the MeV.

FIG. 4 illustrates a graph 400 that depicts different scattering by a neutron 402. As illustrate, neutron 402 may be traveling at a fast speed with high kinetic energy and interacts with nuclei 404, releasing inelastic gamma 406 and lowering the energy state of nucleus 402. After the interaction, neutron 402 contains too much energy to be absorbed, thus continues its path until it interacts with nuclei 408 releasing inelastic gamma 410 and again lowering its energy state again. After the interaction, neutron 402 has the kinetic energy close to target energy 412. Thus, when nucleus 402 at target energy 412 interacts with nuclei 414 it will be captured. This interaction results in a rearranged nucleus 416 containing previously traveling nucleus 402 and an emitted capture gamma 418. Sensing these events with pulsed-neutron logging tool 102 using first neutron detector 112, second neutron detector 114, and/or gamma ray detector 166 (e.g., referring to FIG. 1) may allow for the identification of oil, gas, and/or water in borehole 104 (e.g., referring to FIG. 1).

Figure 5:
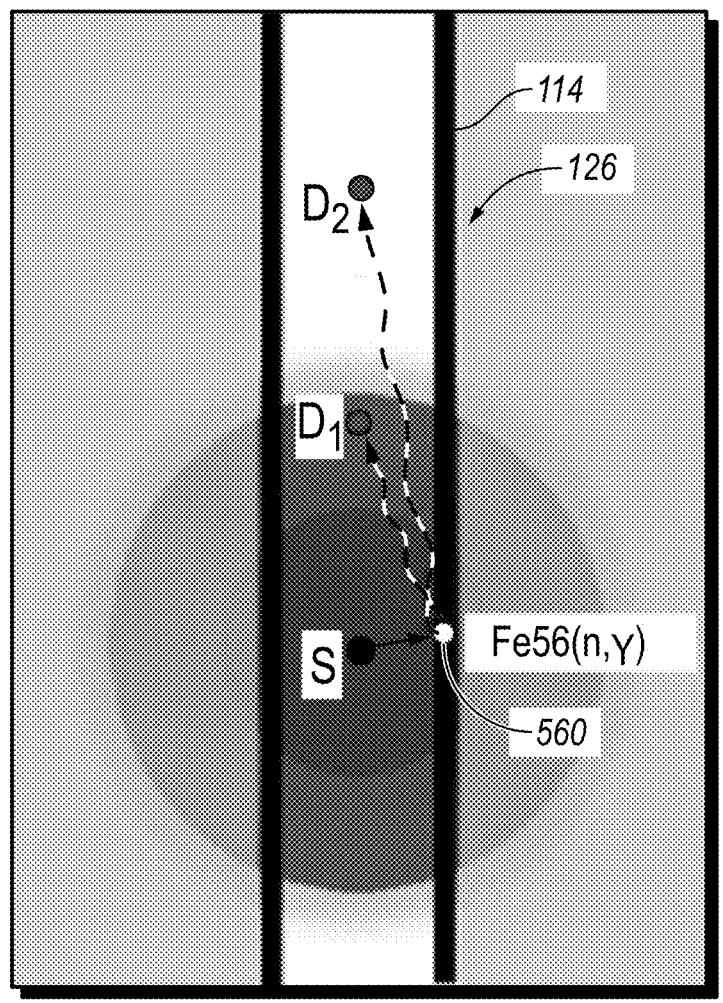
FIG. 5 depicts a thermal neutron inducing gamma rays from a well casing.

FIG. 5 illustrates borehole 104 (e.g., referring to FIG. 1) in which iron 500 may be present. Generally, in borehole 104, iron 500 is an abundant element found in casing materials for well casing 106 and/or pipe string 152 (e.g., referring to FIG. 1). FIG. 5 further illustrates thermal neutron gammas that are induced from iron 500 in casing materials. As shown, induced gammas travel different path lengths through the same electron density, which indicates borehole density and gas content. Thus, induced gamma may be used to correlate attenuation and borehole density. To determine attenuation and borehole density during operations, the following steps and equations are utilized below. Steps may utilize the information that production intensity of 7.6 MeV gammas may be formulated in a given volume of material as:

$$I_{\gamma=7.6 \text{ MeV}} = T_{Fe} * \sigma * \varphi \tag{1}$$

where $T_{Fe}$ is the iron atomic density in the material, $\sigma$ is the capture cross section of iron, and $\varphi$ is the neutron flux at given point. Generated gammas have to attenuate through the material and reach the detector. Thus, the detector count rate at 7.6 MeV may be formulated as:

$$\text{Count Rate} = I_\gamma e^{-\mu \rho x} \tag{2}$$

where $\mu$ is the mass attenuation coefficient at 7.6 MeV, and $\rho$ is the bulk material density, and $x$ is the material thickness for gamma attenuation (distance between gamma creation and detector). Integrating over all coordinates:

$$CR_{7.6MeV} = \int_0^{2\pi} \int_0^R \int_0^\pi \left( \frac{S\sigma T_{Fe}}{4\pi D} \frac{e^{-\frac{r}{L_S}}}{r} e^{-\mu \rho x} \right) d\theta dr \, d\varphi \tag{3}$$

By taking a ratio between multiple detectors, borehole density may be correlated to the measurement as:

$$\frac{CR_{7.6MeV(Near)}}{CR_{7.6MeV(Far)}} = \qquad (4)$$

$$\frac{\frac{S\sigma_{(n,\gamma)}T_{Fe}}{4\pi D}e^{-\mu'\rho R_1}[B_1(\mu'\rho)^3 + B_2(\mu'\rho)^2 + B_3(\mu'\rho) + B_4]}{\frac{S\sigma_{(n,\gamma)}T_{Fe}}{4\pi D}e^{-\mu'\rho R_2}[B'_1(\mu'\rho)^3 + B'_2(\mu'\rho)^2 + B'_3(\mu'\rho) + B'_4]} =$$

$$e^{-\mu'\rho\Delta R}[C_1(\mu'\rho)^3 + C_2(\mu'\rho)^2 + C_3(\mu'\rho) + C_4]$$

Thus, the iron near-to-far capture ratio may be utilized to correlation and calculate borehole density.

FIGS. 6A and 6B illustrate borehole density algorithm quality using differential gamma attenuation in a scatter plot and bar graph, respectfully. FIGS. 6A and 6B show that the model quality where fitting quality is 0.995 with sigma error of 0.0145 g/cc. Alternatively, inelastic scatter gammas (oxygen, carbon, iron, silicon, and/or the like) may be used to formulate borehole density. For example, as discussed above utilizing Equation (4), an iron capture gamma peak is used to find the borehole density. Alternatively, inelastic gammas from O, C, Fe, and Si that are measured by pulsed-neutron logging tool 102 (e.g., referring to FIG. 1) may be used to formulate count rate ratios between near and far to calculate borehole density. however, additional correction is needed to eliminate formation contribution from the answer. Specifically, when inelastic gammas from Carbon, Oxygen, and/or the like are used a correction is needed as formation 108 (e.g., referring to FIG. 1) also contain some carbon and oxygen molecules. Thus, the calculated density contains some formation density.

Improvements from the methods described above may produce an enhanced formation porosity which mitigates a contaminant in the formation of operational environments when measuring density with a pulsed-nucleus logging tool. The pulsed nucleus logging tool provides a unique signature from each geometric region for density measurements. This may be performed by the pulsed neutron tool and neutron emitting a radioactive source. Additionally, the method offers a specific density of borehole instead of a bulk average density and provides unique and complementary method to correct and compensate for borehole effects. The preceding description provides various examples of the systems and methods of use disclosed herein which may contain different method steps and alternative combinations of components.

Statement 1: A method for determining borehole density may include disposing a pulsed-neutron logging tool into a borehole, wherein the borehole has a wellbore casing, emitting a neutron from a neutron source on the pulsed-neutron logging tool into the wellbore casing, wherein the wellbore casing includes iron, and capturing one or more gammas expelled from iron in the wellbore casing in response to the neutron from the neutron source.

Statement 2: The method of statement 1, further comprising formulation a production intensity of 7.6 MeV for the one or more gammas using $I_{\gamma=7.6}$ MeV=$T_{Fe}*\sigma*\varphi$, wherein $T_{Fe}$ is an iron atomic density in a material, $\sigma$ is a capture cross section of iron, and $\varphi$ is a neutron flux at given point.

Statement 3: The method of statement 2, further comprising finding a count rate using Count Rate=$I_\gamma e^{-\mu\rho x}$, wherein $\mu$ is a mass attenuation coefficient at 7.6 MeV, and $\rho$ is a bulk material density, and x is a material thickness for the attenuation of the one or more gammas.

Statement 4: The method of claim 3, further comprising integrating over two or more coordinates using $$CR_{7.6MeV} = \int_0^{2\pi}\int_0^R\int_0^\pi \left(\frac{S\sigma T_{Fe}}{4\pi D}\frac{e^{-\frac{r}{L_S}}}{r}e^{-\mu\rho x}\right)d\theta dr\, d\varphi.$$

Statement 5: The method of statement 4, further comprising taking a ratio between multiple detectors of the count rate to identify a borehole density.

Statement 6: A method for determining borehole density may include disposing a pulsed-neutron logging tool into a borehole, wherein oxygen, carbon, and silicon are disposed in the borehole, emitting a neutron from a neutron source on the pulsed-neutron logging tool into the wellbore casing, and capturing one or more gammas expelled from each of the oxygen, the carbon, and the silicon in the borehole.

Statement 7: The method of statement 6, further comprising formulation a production intensity of 7.6 MeV for the gamma using $I_{\gamma=7.6}$ MeV=$T_{Fe}*\sigma*\varphi$, wherein $T_{Fe}$ is an atomic density of the oxygen, the carbon, or the silicon in a material, $\sigma$ is a capture cross section of iron, and $\varphi$ is a neutron flux at given point.

Statement 8. The method of statement 7, further comprising finding a count rate using Count Rate=$I_\gamma e^{-\mu\rho x}$, wherein $\mu$ is a mass attenuation coefficient at 7.6 MeV, and $\rho$ is a bulk material density, and x is a material thickness for the attenuation of the gamma.

Statement 9. The method of statement 8, further comprising integrating over two or more coordinates using $$CR_{7.6MeV} = \int_0^{2\pi}\int_0^R\int_0^\pi \left(\frac{S\sigma T_{Fe}}{4\pi D}\frac{e^{-\frac{r}{L_S}}}{r}e^{-\mu\rho x}\right)d\theta dr\, d\varphi.$$

Statement 10. The method of statement 9, further comprising taking a ratio between multiple detectors of the count rate to identifying a borehole density.

Statement 11. A system for determining borehole density may include a pulsed-neutron logging tool. The pulsed-neutron logging tool may further include a neutron source configured to emit a neutron into a wellbore casing and a neutron detector configured to capture a gamma expelled from the wellbore casing due to the neutron from the neutron source. The system may further include an information handling system configured to identifying an attenuation and a borehole density.

Statement 12. The system of statement 11, wherein the information handling system is further configured to formulate a production intensity of 7.6 MeV for the gamma of iron using $I_{\gamma=7.6}$ MeV=$T_{Fe}*\sigma*\varphi$, wherein $T_{Fe}$ is an iron atomic density in a material, $\sigma$ is a capture cross section of iron, and $\varphi$ is a neutron flux at given point.

Statement 13. The system of statement 12, wherein the information handling system is further configured to find a count rate using Count Rate=$I_\gamma e^{-\mu\rho x}$, wherein $\mu$ is a mass attenuation coefficient at 7.6 MeV, and $\rho$ is a bulk material density, and x is a material thickness for the attenuation of the gamma.

Statement 14. The system of statement 13, wherein the information handling system is further configured to integrate over two or more coordinates using $$CR_{7.6MeV} = \int_0^{2\pi}\int_0^R\int_0^\pi \left(\frac{S\sigma T_{Fe}}{4\pi D}\frac{e^{-\frac{r}{L_S}}}{r}e^{-\mu\rho x}\right)d\theta dr\, d\varphi.$$

Statement 15. The system of statement 14, wherein the information handling system is further configured to take a ratio between multiple detectors of the count rate to identify the borehole density.

Statement 16. The system of statement 11, wherein the information handling system is further configured to formulate a production intensity of 7.6 MeV for the gamma OF oxygen, carbon, or silicon using $I_{\gamma=7.6}$ MeV=$T_{Fe}*\sigma*\varphi$, wherein $T_{Fe}$ is an atomic density of the oxygen, the carbon, or the silicon in a material, $\sigma$ is a capture cross section of iron, and $\varphi$ is a neutron flux at given point.

Statement 17. The system of statement 16, wherein the information handling system is further configured to find a count rate using Count Rate=$I_\gamma e^{-\mu\rho x}$, wherein $\mu$ is a mass attenuation coefficient at 7.6 MeV, and $\rho$ is a bulk material density, and x is a material thickness for the attenuation of the gamma.

Statement 18. The system of statement 17, wherein the information handling system is further configured to integrate over two or more coordinates using $$CR_{7.6MeV} = \int_0^{2\pi} \int_0^R \int_0^\pi \left( \frac{S\sigma T_{Fe}}{4\pi D} \frac{e^{-\frac{r}{L_S}}}{r} e^{-\mu\rho x} \right) d\theta dr\, d\varphi.$$

Statement 19. The system of statement 18, wherein the information handling system is further configured to take a ratio between multiple detectors of the count rate to identifying a borehole intensity.

Statement 20. The system of statement 11, wherein the information handling system is further configured to identify if a gas is present in a wellbore from the attenuation and the borehole density.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for determining borehole density comprising:
    disposing a pulsed-neutron logging tool into a borehole, wherein the borehole has a wellbore casing;
    emitting a neutron from a neutron source on the pulsed-neutron logging tool into the wellbore casing, wherein the wellbore casing includes iron;
    capturing one or more gammas expelled from iron in the wellbore casing in response to the neutron from the neutron source; and
    determining borehold density utilizing the captured one or more gammas based at least in part on a production intensity, wherein the production intensity is constant.

2. The method of claim 1, further comprising formulating the production intensity of 7.6 MeV for the one or more gammas using $I_{\gamma=7.6}$ MeV=$T_{Fe}*\sigma*\varphi$, wherein $T_{Fe}$ is an iron atomic density in a material, $\sigma$ is a capture cross section of iron, and $\varphi$ is a neutron flux at given point.

3. The method of claim 2, further comprising finding a count rate using Count Rate=$I_\gamma e^{-\mu\rho x}$, wherein $\mu$ is a mass attenuation coefficient at 7.6 MeV, and $\rho$ is a bulk material density, and x is a material thickness for the attenuation of the one or more gammas.

4. The method of claim 3, further comprising integrating over two or more coordinates using $$CR_{7.6MeV} = \int_0^{2\pi} \int_0^R \int_0^\pi \left( \frac{S\sigma T_{Fe}}{4\pi D} \frac{e^{-\frac{r}{L_S}}}{r} e^{-\mu\rho x} \right) d\theta dr\, d\varphi.$$

5. The method of claim 4, further comprising taking a ratio between multiple detectors of the count rate to identify a borehole density.

6. A method for determining borehole density comprising:
    disposing a pulsed-neutron logging tool into a borehole;
    emitting a neutron from a neutron source on the pulsed-neutron logging tool into the wellbore casing;
    capturing one or more gammas expelled from the borehole; and
    determining borehole density utilizing the captured one or more gammas based at least in part on a production intensity, wherein the production intensity is constant.

7. The method of claim 6, further comprising formulating a production intensity of 7.6 MeV for the gamma using $I_{\gamma=7.6 \, MeV} = T_{Fe} * \sigma * \varphi$, wherein $T_{Fe}$ is an atomic density of the oxygen, the carbon, or the silicon in a material, $\sigma$ is a capture cross section of iron, and $\varphi$ is a neutron flux at given point.

8. The method of claim 7, further comprising finding a count rate using Count Rate=$I_\gamma e^{-\mu \rho x}$, wherein $\mu$ is a mass attenuation coefficient at 7.6 MeV, and $\rho$ is a bulk material density, and x is a material thickness for the attenuation of the gamma.

9. The method of claim 8, further comprising integrating over two or more coordinates using $$CR_{7.6MeV} = \int_0^{2\pi} \int_0^R \int_0^\pi \left( \frac{S\sigma T_{Fe}}{4\pi D} \frac{e^{-\frac{r}{L_s}}}{r} e^{-\mu \rho x} \right) d\theta dr \, d\varphi.$$

10. The method of claim 9, further comprising taking a ratio between multiple detectors of the count rate to identifying a borehole density.

11. A system for determining borehole density comprising:
a pulsed-neutron logging tool comprising:
a neutron source configured to emit a neutron into a wellbore casing; and
a neutron detector configured to capture a gamma expelled from the wellbore casing due to the neutron from the neutron source; and
an information handling system for:
identifying an attenuation and a borehole density; and
formulating a production intensity of 7.6 MeV for the gamma of iron using $I_{\gamma=7.6 \, MeV} = T_{Fe} * \sigma * \varphi$ wherein $T_{Fe}$ is an iron atomic density in a material, $\sigma$ is a capture cross section of iron, and $\varphi$ is a neutron flux at given point.

12. The system of claim 11, wherein the information handling system further finds a count rate using Count Rate=$I_\gamma e^{-\mu \rho x}$, wherein $\mu$ is a mass attenuation coefficient at 7.6 MeV, and $\rho$ is a bulk material density, and x is a material thickness for the attenuation of the gamma.

13. The system of claim 12, wherein the information handling system further integrates over two or more coordinates using $$CR_{7.6MeV} = \int_0^{2\pi} \int_0^R \int_0^\pi \left( \frac{S\sigma T_{Fe}}{4\pi D} \frac{e^{-\frac{r}{L_s}}}{r} e^{-\mu \rho x} \right) d\theta dr \, d\varphi.$$

14. The system of claim 13, wherein the information handling system further takes a ratio between multiple detectors of the count rate to identify the borehole density.

15. The system of claim 11, wherein the information handling system further formulates a production intensity of 7.6 MeV for the gamma OF oxygen, carbon, or silicon using $I_{\gamma=7.6 \, MeV} = T_{Fe} * \sigma * \varphi$, wherein $T_{Fe}$ is an atomic density of the oxygen, the carbon, or the silicon in a material, $\sigma$ is a capture cross section of iron, and $\varphi$ is a neutron flux at given point.

16. The system of claim 15, wherein the information handling system further finds a count rate using Count Rate=$I_\gamma e^{-\mu \rho x}$, wherein $\mu$ is a mass attenuation coefficient at 7.6 MeV, and $\rho$ is a bulk material density, and x is a material thickness for the attenuation of the gamma.

17. The system of claim 16, wherein the information handling system further integrates over two or more coordinates using $$CR_{7.6MeV} = \int_0^{2\pi} \int_0^R \int_0^\pi \left( \frac{S\sigma T_{Fe}}{4\pi D} \frac{e^{-\frac{r}{L_s}}}{r} e^{-\mu \rho x} \right) d\theta dr \, d\varphi.$$

18. The system of claim 17, wherein the information handling system further takes a ratio between multiple detectors of the count rate to identifying a borehole intensity.

19. The system of claim 11, wherein the information handling system further identifies if a gas is present in a wellbore from the attenuation and the borehole density.

* * * * *